United States Patent
Hirsch et al.

(10) Patent No.: US 6,924,055 B2
(45) Date of Patent: Aug. 2, 2005

(54) FUEL DELIVERY CARTRIDGE AND ANODIC FUEL RECEPTOR FOR A FUEL CELL

(75) Inventors: Robert S. Hirsch, Troy, NY (US); Gerhard Beckmann, Altamont, NY (US); Juan J. Becerra, Altamont, NY (US); Hongsun Kim, Clifton Park, NY (US); Michael S. DeFillipis, Niskayuna, NY (US)

(73) Assignee: The Gillette Company, Boston, MS (US)

(*) Notice: Subject to any disclaimer, the term of this patent is extended or adjusted under 35 U.S.C. 154(b) by 583 days.

(21) Appl. No.: 10/084,097

(22) Filed: Feb. 27, 2002

(65) Prior Publication Data

US 2003/0162070 A1 Aug. 28, 2003

(51) Int. Cl.[7] ............................................... H01M 2/00
(52) U.S. Cl. ............................ 429/34; 429/38; 429/39
(58) Field of Search ............................. 429/19, 34, 38, 429/39, 30

(56) References Cited

U.S. PATENT DOCUMENTS

| | | |
|---|---|---|
| 4,673,624 A | 6/1987 | Hockaday |
| 4,810,597 A | 3/1989 | Kumagai et al. |
| 5,523,177 A | 6/1996 | Kosek et al. |
| 5,573,866 A | 11/1996 | Van Dine et al. |
| 5,599,638 A | 2/1997 | Surampudi et al. |
| 5,631,099 A | 5/1997 | Hockaday |
| 5,723,228 A | 3/1998 | Okamoto |
| 5,759,712 A | 6/1998 | Hockaday |
| 5,766,786 A | 6/1998 | Fleck et al. |
| 5,773,162 A | 6/1998 | Surampudi et al. |
| 5,795,668 A | 8/1998 | Banerjee |
| 5,916,699 A | 6/1999 | Thomas et al. |
| 5,945,231 A | 8/1999 | Narayanan et al. |
| 5,992,008 A * | 11/1999 | Kindler ........................ 29/730 |
| 6,460,733 B2 * | 10/2002 | Acker et al. .................. 222/94 |
| 6,506,513 B1 | 1/2003 | Yonetsu et al. |
| 2003/0008193 A1 | 1/2003 | Kinkelaar et al. |

FOREIGN PATENT DOCUMENTS

EP   1274144 A2   1/2003

OTHER PUBLICATIONS

"Fuel Cell", 1992 Fuel Cell Seminar, Program and Abstracts, pp. 233–236, 461–464, no month available.

"Miniaturized Fuel Cells for Portable Power", Helen L. Maynard and Jeremy P. Meyers, Lucent Technologies, 2000, no month available.

"Pocket–size PEMs", Paul Sharke, Mechanical Engineering, no month/year available.

"Polymer Electrolyte Fuel Cells as Potential Power Sources for Portable Electronic Devices", Shinshon Gottesfeld and Mahlon S. Wilson, pp. 486–517, no month/year available.

* cited by examiner

Primary Examiner—Bruce F. Bell
(74) Attorney, Agent, or Firm—Cesari & McKenna, LLP; Rita M. Rooney, Esq.

(57) ABSTRACT

An improved fuel delivery system and fuel cell system is provided which includes a component, which delivers fuel from the fuel cartridge by connecting with a corresponding component in the anode chamber of the fuel cell. Liquid fuel is transported into the anode area via an action in which fuel is drawn through the material which may be substantially comprised of a foam-based substance. Gases, including carbon dioxide, that are produced in the anodic reaction can be removed because the foam is gas permeable. Electrons produced in the reaction are collected by a wire mesh that lies between the foam and the membrane electron assembly. The flow of fuel between the foam and the fuel cartridge and the foam and the anode can be interrupted by breaking the connection between the cartridge and the cell, or the cartridge can be pulled away from the fuel cell to break the connection between the foam components. The invention may be employed with a fuel cell stack, or with an enclosed, refillable fuel cell system. The cathode side of the fuel cell may also have a foam component to draw water away from the membrane electrode assembly while allowing oxygen to come in contact with the membrane.

31 Claims, 10 Drawing Sheets

FUEL DELIVERY CARTRIDGE AND ANODIC FUEL RECEPTOR FOR A FUEL CELL

BACKGROUND OF THE INVENTION

1. Field of the Invention

This invention relates generally to direct oxidation fuel cells, and more particularly, to components for storing and transporting the liquid fuel and reactants for use in such fuel cells.

2. Background Information

Fuel cells are devices in which an electrochemical reaction is used to generate electricity. A variety of materials may be suited for use as a fuel depending upon the materials chosen for the components of the cell. Organic materials, such as methanol or natural gas, are attractive choices for fuel due to the their high specific energy.

Fuel cell systems may be divided into "reformer-based" systems (i.e., those in which the fuel is processed in some fashion to extract hydrogen from the fuel before it is introduced into the fuel cell system) or "direct oxidation" systems in which the fuel is fed directly into the cell without the need for separate internal or external processing. Most currently available fuel cells are reformer-based fuel cell systems. However, because fuel-processing is expensive and requires significant volume, reformer based systems are presently limited to comparatively high power applications.

Direct oxidation fuel cell systems may be better suited for a number of applications in smaller mobile devices (e.g., mobile phones, handheld and laptop computers), as well as in some larger applications. Typically, in direct oxidation fuel cells, a carbonaceous liquid fuel in an aqueous solution (typically aqueous methanol) is applied to the anode face of a membrane electrode assembly (MEA). The MEA contains a protonically conductive, electronically non-conductive membrane (PCM). Typically, a catalyst which enables direct oxidation of the fuel on the anode is disposed on the surface of the PCM (or is otherwise present in the anode chamber of the fuel cell). Protons (from hydrogen found in the fuel and water molecules involved in the anodic reaction) are separated from the electrons. The protons migrate through the PCM, which is impermeable to the electrons. The electrons thus seek a different path to reunite with the protons and oxygen molecules involved in the cathodic reaction and travel through a load, providing electrical power.

One example of a direct oxidation fuel cell system is a direct methanol fuel cell system or DMFC system. In a DMFC system, methanol, typically in an aqueous solution is used as fuel (the "fuel mixture"), and oxygen, preferably from ambient air, is used as the oxidizing agent. There are two fundamental reactions that occur in a DMFC which allow a DMFC system to provide electricity to power consuming devices: the anodic disassociation of the methanol and water fuel mixture into $CO_2$, protons, and electrons; and the cathodic combination of protons, electrons and oxygen into water. The overall reaction may be limited by the failure of either of these reactions to proceed to completion at an acceptable rate (more specifically, failure to oxidize the fuel mixture will limit the cathodic generation of water, and vice versa).

Fuel cells and fuel cell systems have been the subject of intensified recent development because of their ability to efficiently convert the energy in carbonaceous fuels into electric power while emitting comparatively low levels of environmentally harmful substances. The adaptation of fuel cell systems to mobile uses, however, is not straight-forward because of the technical difficulties associated with reforming most carbonaceous fuels in a simple, cost effective manner, and within acceptable form factors and volume limits. Further, a safe and efficient storage means for substantially pure hydrogen (which is a gas under the relevant operating conditions), presents a challenge because hydrogen gas must be stored at high pressure and at cryogenic temperatures or in heavy absorption matrices in order to achieve useful energy densities. It has been found, however, that a compact means for storing hydrogen is in a hydrogen rich compound with relatively weak chemical bonds, such as methanol or an aqueous methanol solution (and to a lesser extent, ethanol, propane, butane and other carbonaceous liquids or aqueous solutions thereof).

In particular, DMFCs are being commercially developed for use in portable electronic devices. Thus, the DMFC system, including the fuel cell, and the components may be fabricated using materials that not only optimize the electricity-generating reactions, but which are also cost effective. Furthermore, the manufacturing process associated with those materials should not be prohibitive in terms of labor intensity cost.

As noted, typical DMFC systems include a fuel source, fluid and effluent management systems, and a direct methanol fuel cell ("fuel cell"). The fuel cell typically consists of a housing, and a membrane electrode assembly ("MEA") disposed within the housing. A typical MEA includes a centrally disposed protonically conductive, electronically non-conductive membrane ("PCM"). One example of a commercially available PCM is Nafion® a registered trademark of E.I. Dupont de Nemours and Company, a cation exchange membrane based on perflouorocarbon polymers with side chain termini of perflourosulfonic acid groups, in a variety of thicknesses and equivalent weight. The PCM is typically coated on each face with an electrocatalyst such as platinum, or platinum/ruthenium mixtures or alloy particles. On either face of the catalyst coated PCM, the electrode assembly typically includes a diffusion layer. The diffusion layer functions to evenly distribute the liquid fuel mixture across the anode in the case of the fuel, or the gaseous oxygen from air or other source across the cathode face of the PCM. In addition, flow field plates are often placed on the surface of the diffusion layers which are not in contact with the coated PCM. The flow field plates function to provide mass transport of the reactants and by products of the electrochemical reactions, and they also have a current collection functionality in that the flow field plates act to collect and conduct electrons through the load.

Many direct methanol fuel cell systems employ an active management scheme to manage the reactants and byproducts in the fuel cell, including pumping or otherwise causing the fuel mixture to be transported to the anodic face of the PCM. In addition, there may be an actively managed system which removes anodically evolved carbon dioxide from the anode face of the PCM, or which induces air to the cathode face of the PCM. To increase the utility and effectiveness of DMFC systems, there may be a need for a variety of types of diffusion layers and flow field plates. In some cases, a hydrophobic (or partially hydrophobic) diffusion layer is a useful component to assist in the control of reactants or byproducts.

Some of these active transport mechanisms however can be costly, both in terms of the components required and the complexity introduced into the manufacturing of such mechanisms. This reduces the feasibility for these items to be produced on a commercial scale. In addition, adding additional components, such as pumps and other active transport devices, can increase parasitic power losses in an already small device. Such components further add volume to a system that must meet demanding form factors.

It is also noted that, when fuel from a fuel source or reservoir builds up on the anode side of the MEA, any extra fuel not consumed in the reaction that may pass from the anode aspect of the MEA to the cathode aspect of the MEA through the membrane and be lost to that reaction. One method of preventing this reaction is to circulate fuel through the anode chamber, but this requires the use of active transport components. On the cathode side, the cathode diffusion layer can become saturated by water (a byproduct of the cathode half reaction), that has passed through the membrane, as well as water that is generated by the cathodic oxidation of the methanol that has crossed over the membrane. Thus, water builds up in the cathode chamber of the fuel cell. The cathode diffusion layer can thus become flooded, in which case the cathode half reaction is compromised, or even halted. In either case, whether it is fuel loss on the anode side or cathode flooding, the half reactions at either the anode or the cathode can correspondingly be compromised or even prevented, thus reducing the efficiency of the fuel cell.

Typically, the risk of cathode flooding has been mitigated by encouraging cathodic airflow across the cathode diffusion layer to remove water from the cathode layer. This, however, increases the cost and complexity of the fuel cell system, thus adding to the expense of manufacture, as well as introducing the above-mentioned parasitic losses. There have been attempts to reduce the risk of cathode flooding by providing active drying of water from the cathode chamber, but this can increase the cost and complexity of the fuel cell, adding to the expense of manufacture, as well as introducing additional possibility of parasitic losses.

There remains a need, therefore, for a fuel delivery cartridge, direct methanol fuel cell, and a direct methanol fuel cell system that provides optimal fuel delivery properties by which fuel can be delivered to the active anode chamber as it is consumed, thereby minimizing the amount of additional fuel that is introduced, and limiting the amount of fuel that crosses over the membrane. There remains a further need to provide a cathode chamber in the fuel cell that resists water build up, while allowing oxygen to come into contact with the cathode face of the membrane.

It is thus an object of the invention to provide a fuel cell and fuel cartridge that provides fuel to the anode as it is consumed and reduces the risk of cathode flooding, while keeping the cost and complexity of the fuel cell to a minimum.

SUMMARY OF THE INVENTION

The present invention is an improved fuel delivery cartridge and anode for a fuel cell, which includes a component that delivers fuel from the fuel cartridge by connecting with a corresponding component in the anode chamber of the fuel cell. Liquid fuel is drawn into the anode area via an action in which fuel is drawn through the anode receptor, on an "as needed" basis, as it is consumed. Carbon dioxide, which is produced in the anodic reaction, is also removed because the anodic receptor component is gas permeable. Electrons released from the reaction are collected by a wire mesh that, in one embodiment, lies between the anodic receptor component and the membrane electron assembly.

More specifically, the fuel cell cartridge contains a fuel delivery component that is comprised substantially of a material that possesses properties that allow fuel to be transported towards the MEA as needed, as fuel is consumed. While not limiting the scope of the invention, the material may include a foam substance, such as an expanded polymer, or other traditional foam, or it may be a conductive material to which a process or second material is applied which creates an electronically conductive, porous, high capillarity material, such as a felted metal.

A similar insert is disposed in the anode chamber of the fuel cell. This anodic fuel receptor may be a hydrophilic material that absorbs, or draws fuel in, the anode chamber as fuel is consumed by the system. The fuel delivery component holds fluid, and may be substantially saturated with a fluid that is, in an exemplary case, methanol having concentration of up to 100%, but which may be lower. When the fuel delivery component (in the fuel cartridge) is placed in contact with the anodic fuel receptor in the anode chamber, fuel is delivered to the fuel cell across a volume gradient. This starts a wicking action by which liquid fuel solution is drawn into the anode as it is consumed by the cell.

The anodic fuel receptor is also preferably a material that is permeable to gases. Consequently, the carbon dioxide generated in the anodic reaction is thus transported away from the anode face of the membrane electrode assembly by the anodic fuel receptor material. This also furthers the replacement of fuel into the anode chamber as fuel is consumed. It is desirable, in accordance with the invention, to vent the carbon dioxide out of the anode chamber, while avoiding oxygen entering the chamber from the environment, as discussed in further detail herein.

In accordance with another aspect of the invention, a wire mesh backing is applied to the anodic fuel receptor component, on the side contiguous to the anode face of the PCM. This provides a path for electrons from the anode to the applied load. In addition, the foam material of the anodic fuel receptor, may itself be conductive to further conduct the flow of electrons.

When it is desired to power the device down, flow of fuel can be interrupted when the flow path between the fuel delivery cartridge and the fuel cell is blocked by a mechanical mechanism, or by the response of a smart material such as nitinol. Alternatively, the fuel delivery cartridge may be physically separated from the fuel cell.

The cathode chamber of the fuel cell may also include a foam-based component to draw water away from the PCM, while permitting oxygen to come into contact with the cathode face for the cathode half reaction. This cathode component may also be conductive to allow better conduction of electrons from the cathode mesh to the MEA.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
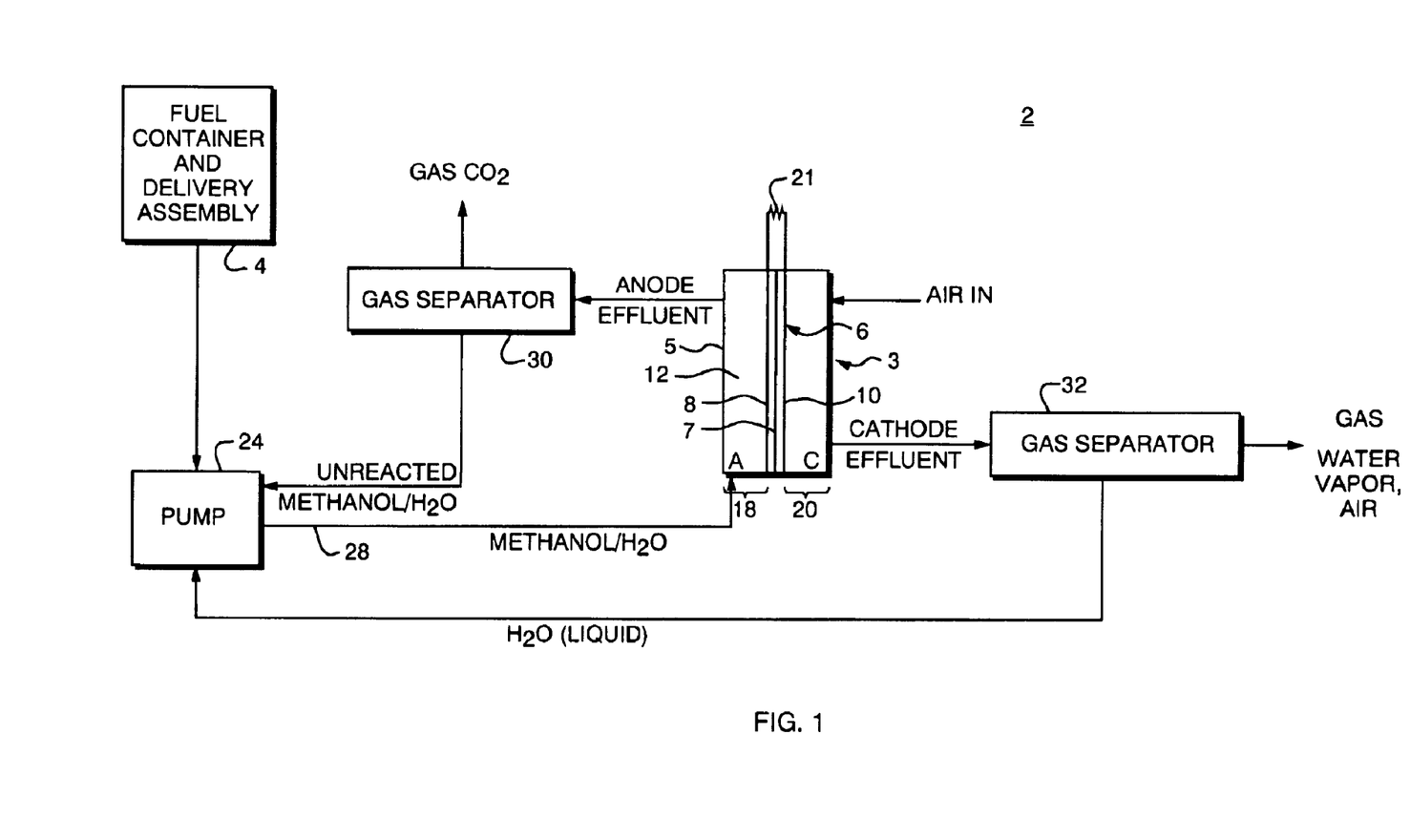
FIG. 1 is a block diagram of a direct oxidation fuel cell system with which the fuel cartridge and fuel cell of the present invention may be employed.

For a better understanding of the invention, the components of a direct oxidation fuel cell system, a direct oxidation fuel cell and the basic operation of a DMFC fuel cell system, known to those skilled in the art will be briefly described. A direct oxidation fuel cell system 2 is illustrated in FIG. 1. The fuel cell system 2 includes a direct oxidation fuel cell, which may be a direct methanol fuel cell 3 ("DMFC"), for example. For purposes of illustration we herein describe an illustrative embodiment of the invention with DMFC 3, with the fuel substance being methanol or an aqueous methanol solution. It should be understood, however, that it is within the scope of the present invention that other fuels may be used in an appropriate fuel cell. Thus, as used herein, the word "fuel" shall include methanol and ethanol or combinations thereof and aqueous solutions thereof, and other carbonaceous fuels amenable to use in direct oxidation fuel cell systems.

The system 2, including the DMFC 3, has a fuel delivery system to deliver fuel which is constructed in accordance with the present invention, and which will be described in further detail with reference to the remaining drawings.

The DMFC 3 includes a housing 5 that encloses a membrane electrode assembly 6 (MEA). MEA 6 incorporates protonically conductive, electronically non-conductive membrane 7. PCM 7 has an anode face 8 and cathode face 10, each of which may be coated with a catalyst, including but not limited to platinum or a blend of platinum and ruthenium. The portion of DMFC 3 defined by the housing 5 and the anode face of the PCM is referred to herein as the anode chamber 18. The portion of DMFC 3 defined by the housing and the cathode face of the PCM on the cathode side is referred to herein as the cathode chamber 20. Additional elements of the direct methanol fuel cell system such as flow field plates, and diffusion layers (not shown in FIG. 1) to manage reactants and products may be included within anode chamber 18 and cathode chamber 20.

As will be understood by those skilled in the art, electricity generating reactions occur when a fuel substance is introduced to the anode face of the PCM 8, and oxygen, usually in the form of ambient air, is introduced to the cathode face of the PCM 10.

Catalysts on the membrane surface (or which are otherwise present on the membrane surface) enable the direct oxidation of the carbonaceous fuel on the anode face of the PCM 8 separating hydrogen protons and electrons from the fuel and water molecules of the fuel mixture. Upon the closing of a circuit, the protons pass through PCM 7, which is impermeable to the electrons. The electrons thus seek a different path to reunite with the protons, and travel through a load 21 of an external circuit, thus providing electrical power to the load. So long as the reactions continue, a current is maintained through the external circuit. Direct oxidation fuel cells produce water ($H_2O$) and carbon dioxide ($CO_2$), as products of the reaction.

Figure 2:
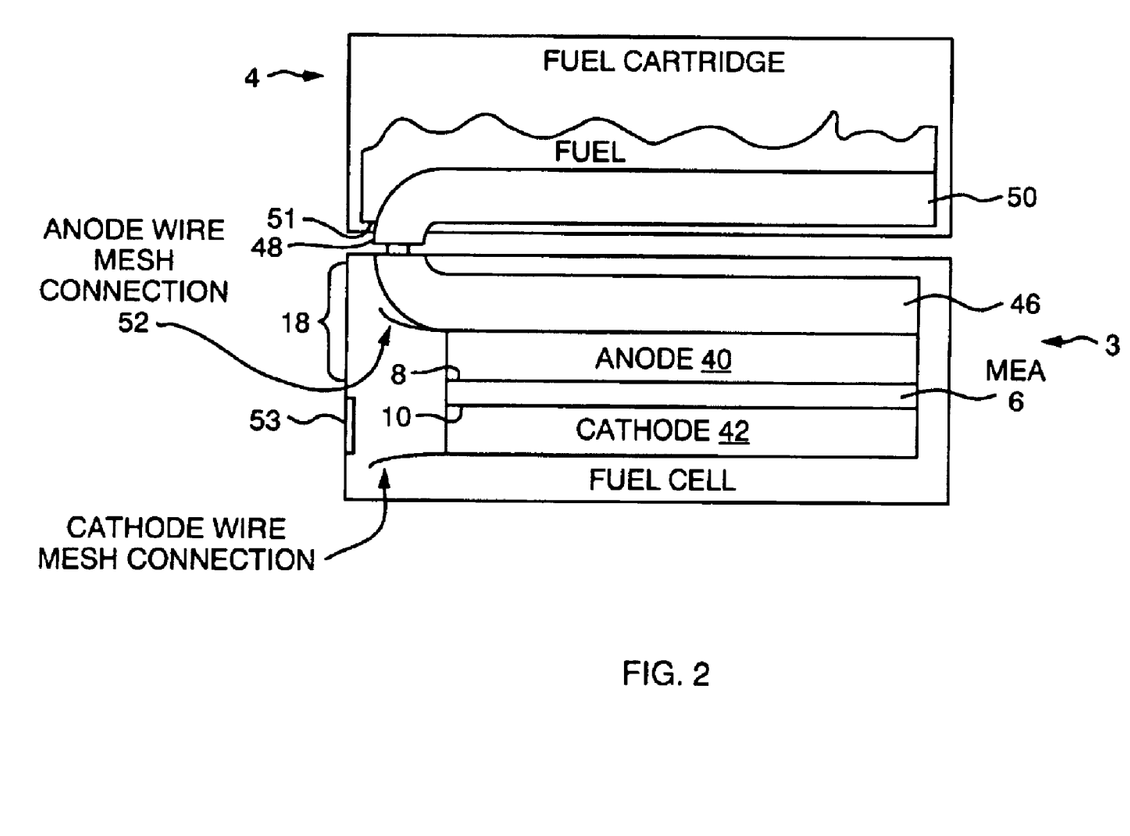
FIG. 2 is a schematic cross section of a fuel cell and fuel cell cartridge illustrating the fuel delivery component of the present invention in the fuel cartridge and the anodic receptor in the cell, in accordance with one aspect of the present invention.

FIG. 2 illustrates a fuel cartridge and fuel cell assembly in accordance with one aspect of the present invention. More specifically, a fuel cell 3 includes the membrane is electrode assembly 6 (sometimes referred to herein as MEA) which in turn includes a centrally disposed, protonically-conductive membrane (PCM) 7 (visible in FIG. 1), which is impermeable to electrons, an anode diffusion layer 40 and cathode diffusion layer 42. The PCM 7 is composed of a suitable material, such as Nafion®, described above. The catalyzed anode face 8 of the PCM is in intimate contact with an anode diffusion layer 40 which is electrically conductive, and which may be treated to impart some level of hydrophobicity or hydrophilicity to it. As is understood by those skilled in the art, the diffusion layer may consist of a plurality of pieces of carbon paper or a piece of carbon cloth that have been treated with polytetrafluoroethylene (PTFE) and high surface carbon particles.

In accordance with the invention, the fuel cell 3 also contains an anodic fuel receptor 46. The fuel receptor 46 is comprised substantially of a material that possesses properties that allow fuel to be transported towards the MEA as needed, as it is consumed. While not limiting to the invention, the material may be a substantially hydrophilic methanol resistant material, such as a foam, which draws liquid fuel into the anode chamber 18. In accordance with one aspect of the invention, the material may be polyurethane or a metallized polyurethane foam or other foam substance, such as an expandable polymer, other traditional foam, or it may be a conductive material to which a process or second material is applied which creates an electronically conductive, porous, high capillarity material, such as a felted metal. The materials selected will be chosen to encourage the efficient transfer of fuel from the fuel delivery component 50 to the anodic fuel receptor. For example, and not by way of limitation, said materials selected for the anodic fuel receptor may be of higher capillarity than the fuel cartridge component material, discussed in detail hereinafter, in order to encourage flow into the anode chamber and to limit backflow of fuel from the anode chamber to the fuel delivery cartridge.

Correspondingly, in a fuel delivery cartridge 4, a fuel delivery component 50 is a material that holds a fuel solution and, when it contacts the anodic fuel receptor 46 of the anode portion of the fuel cell, fuel is delivered into the cell. More specifically, the fuel delivery component 50 is comprised substantially of a material that possesses properties that allow fuel to be transported towards the anodic fuel receptor 46. While not limiting to the invention, the material may be a substantially hydrophilic, methanol resistant material such as a foam that transports fuel solution into the anode chamber as needed as it is consumed. In accordance with one aspect of the invention, the material may be polyurethane or a metallized polyurethne foam or other foam substance, such as an expandable polymer, or other traditional foam, or it may be a conductive material to which a process or second material is applied which creates an electronically conductive, porous, high capillarity material such as a felted metal.

In addition, it is noted that the fuel delivery component 50 is not necessarily comprised of the same material as the anodic fuel receptor 46. Indeed, it may be desirable for performance or manufacturing purposes to have one material, such as a more expensive metallized foam, in the anode chamber of the fuel cell, and another material, such as a less expensive urethane foam for the cartridge/delivery component. Thus, the two components may each be comprised of the types of materials described herein, but they are not necessarily comprised of the same materials.

The anode chamber 18, as illustrated in FIG. 2, includes diffusion layer 40 and the anodic fuel receptor 46. Sandwiched between the diffusion layer 40 and the anodic fuel receptor 46 is an anode wire mesh 52. The anode wire mesh collector is applied to the foam to provide a path for the electrons that are produced as part of the anodic reaction when the fuel strikes contact points on the membrane and reacts to form carbon dioxide, electrons and protons. The protons pass through the MEA 6, and the electrons travel along the conductive wire mesh backing to the applied load (not shown in FIG. 2). To aid in this collection of electrons, the foam itself may be conductive in order to increase the surface area available for electron collection.

When assembled, as illustrated in FIG. 2, the interface 48 between the fuel cartridge 4 and fuel cell 3, provides a seal to avoid evaporative losses, or leakage losses, and the interface 48, is small in order to limit any potential "backflow", but adequate to supply the fuel cell with sufficient fuel under high load conditions Moreover, carbon dioxide is removed from the anode chamber 18 through the anodic fuel receptor 46. The material selected for the anode receptor component has properties that allow gas permeability. Thus, liquid fuel remains within the receptor and travels ultimately to the active electrode area of the cell, while carbon dioxide gas generated in the anodic reaction is drawn away from the anode surface of the membrane through the anode receptor. The carbon dioxide is then removed by venting it into the system environment or atmosphere, through the vent 53 (FIG. 1).

More specifically, the anodic fuel receptor is preferably in physical contact with anode diffusion of the PCM 7. the anodic fuel receptor allows anodically generated carbon dioxide gas to travel away from the anode surface, and is then vented to the ambient environment, typically by a vent 53 in the anode chamber 18 (FIG. 2).

However, those skilled in the art will also recognize that the vent 53 will not only allow carbon dioxide to be released, but may allow atmospheric oxygen to enter into the anode compartment of the fuel cell. If excess oxygen does enter the anode chamber, it may adversely affect the performance of the DMFC and the DMFC system. Nevertheless, this problem may be addressed by utilizing a gas selective material for the vent, such as a membrane, tube, or other structure, fabricated from Teflon AF® available from Biogeneral Inc. which preferentially allows carbon dioxide, but significantly less oxygen, to pass through it, thus limiting the amount of oxygen being introduced to the system while still allowing carbon dioxide to be removed from the system. It may further be possible to cause the carbon dioxide to travel to the ambient environment via a tortuous path once it has been eliminated from the fuel cell, thus creating a "blanket" of carbon dioxide that will substantially prevent oxygen from passing into the anode chamber. The formation of a "blanket" of carbon dioxide is further assisted by the fact that a higher partial CO2 pressure inside the anode chamber than the atmospheric pressure drives the CO2 flux leaving the anode chamber. Other methods, including the use of valves and other mechanical apparatus may also be used to limit the flow of oxygen into the anode chamber.

Carbon dioxide could, alternatively, be re-directed to the cathode chamber. One method of accomplishing this is described in commonly owned, co-pending, provisional U.S. patent application Ser. No. 60/250,592, entitled FUEL CELL SYSTEM WITH INTEGRATED GAS SEPARATION, filed on Nov. 30, 2000.

FIG. 2 illustrates the MEA 6, the anode diffusion layer 40, the wire mesh 52 and anodic fuel receptor 46 in such a manner that the anode diffusion layer 40 appears to have the same depth dimension as the anodic fuel receptor 46. This is for purposes of clarity of illustration, it is more likely that the anode diffusion layer (which may be a combination of carbon paper or carbon cloth) is much thinner than the foam. It is within the scope of this invention that the foam could perhaps fill the entire anode chamber and may be in intimate contact with the membrane, thus making the use of a traditional diffusion layer unnecessary in certain applications.

It is preferable to control the flow of fuel solution from the fuel cartridge 4 to the fuel cell 3. For example, it may be desirable to reduce or terminate the power to the device being operated by the fuel cell in which case, the fuel flow from the cartridge to the cell is to be partially interrupted to slow down the fuel flow, or completely interrupted in order to turn the device off. In accordance with one aspect of the invention, the contact between the fuel cartridge component and the anode fuel receptor is broken.

Figure 3:
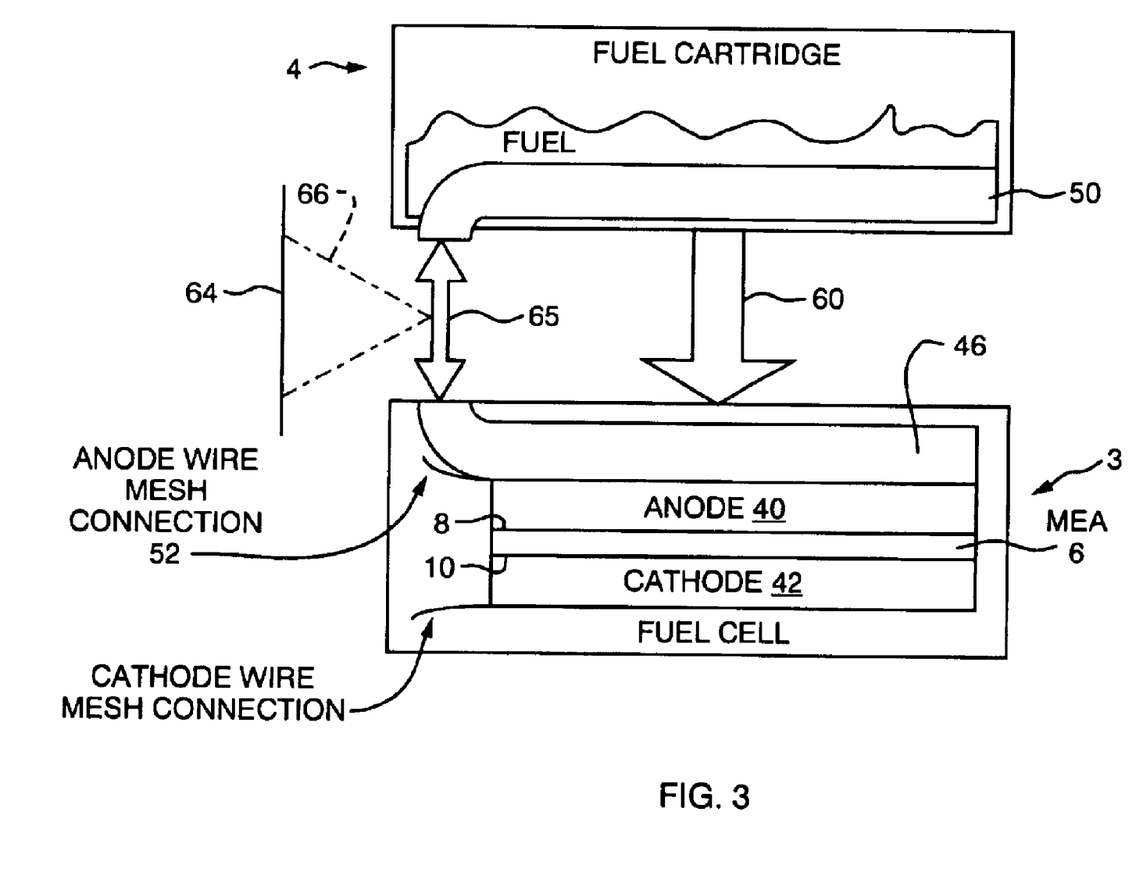
FIG. 3 is the device of FIG. 2 showing the separation between the fuel delivery cartridge and the fuel cell to interrupt the flow of fuel in accordance with the present invention.

For example, the cartridge 4 can be physically separated from the fuel cell, as illustrated by the gap 60 of FIG. 3. Alternatively, contact between the components 46 and 50 can be broken by a physical means that interrupts the contact between the fuel delivery component 50 and the anodic fuel receptor 46. More specifically, in accordance with another aspect of the invention, a heat sensitive mechanism may be employed to control or cease the flow of fuel from the fuel delivery cartridge 50 to the anodic fuel receptor 46. A shape memory alloy (SMA) may be used as the mechanism. In accordance with one embodiment of the invention, the SMA available commercially as nitinol is used for this purpose. Nitinol is an acronym for nickel titanium alloy, and is supplied commercially by NDC of Fremont, Calif. Nitinol exhibits unique behavior including that of "shape memory" and "superelasticity." Other substances that exhibit similar properties, such as polymers that have superelasticity and shape memory, may also be employed.

Figure 4A:
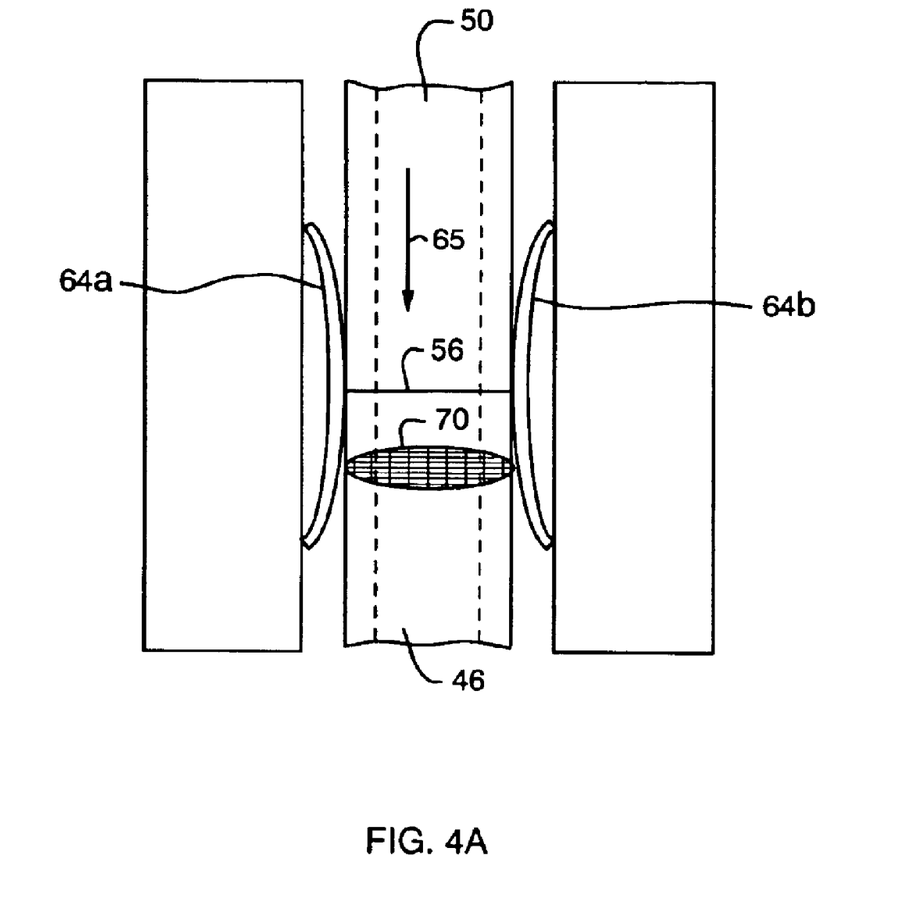
FIG. 4A is schematic illustration of the fuel flow path as formed by the connection of the fuel delivery component and the anode fuel receptor with the SMA strips disposed adjacent to the fuel path.
Figure 4B:
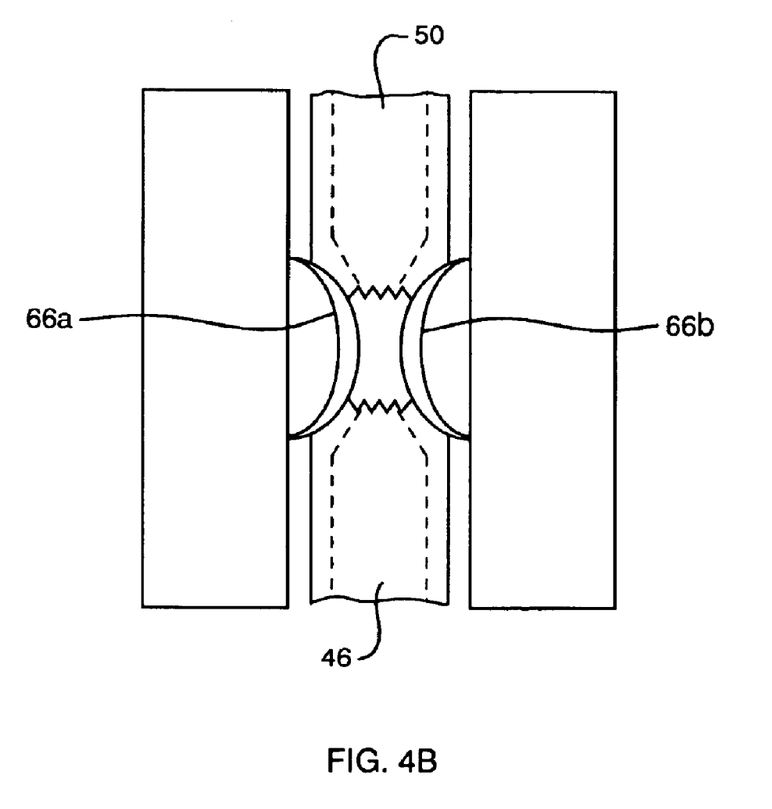
FIG. 4B is the device of FIG. 4A with the SMA strips deformed to break the connection between the anode fuel receptor and the fuel delivery cartridge of the present invention.

As illustrated in FIGS. 4A and 4B, the nitinol springs (in this case, leaf springs) 64a and 64b are placed along the fuel flow path 65 formed by the connection between the fuel delivery cartridge 50 and the anodic fuel receptor 46. As noted herein, if the connection 56 between the fuel delivery cartridge 50 and the anodic fuel receptor 46 is broken, then the flow of fuel is interrupted as desired. In order to break this connection, the nitinol springs 64a and 64b are deformed to break the connection and interrupt the flow of fuel.

More specifically, and by way of background, the SMA has a first shape at ambient temperatures, but at a higher, threshold temperature, the SMA takes on a deformed, or austenite shape. In the present case, when the fuel cell is connected to an electrical load, and electricity is produced, the fuel cell begins generate heat as a result of the chemical reactions within the cell. At a threshold temperature, each nitinol spring, 64a and 64b, deforms to its austenite shape, as illustrated in FIG. 4B, as deformed strips 66a and 66b, respectively, thus breaking the contact between the fuel delivery cartridge 50 and the anodic receptor component 46.

The change in shape of the nitinol springs may also be controlled when an electric current is passed through the springs 64a and 64a, thus heating each of the springs. This may allow greater control of when the shape change occurs. Depending upon the design of the fuel cell, the actuation of the SMA spring can be custom tailored to be triggered by temperature, or by passing a current through the nitinol when certain conditions occur in order to limit the fuel supply. Specifically, the spring may be designed such that upon activation, fuel is slowed to a predetermined point, or is completely shut off.

Although the present invention is shown and described using two SMA springs, a single SMA spring may be easily designed to perform the intended valve/switch function.

In the present invention, a nitinol spring 64 is placed along the fuel flow path 65 between fuel delivery component 50 and anodic fuel receptor 46. The nitinol strip is in a relaxed position when fuel is flowing along fuel path 65. However, it is desired to interrupt the flow of fuel across path 65, the nitinol strip is deformed, by an external applied electric current (not shown), as illustrated in phantom as component 66 in FIG. 3A. When the current is stopped, the nitinol spring 64 resumes original shape that allows fuel to be transported along the fuel flow path 65, as shown in FIG. 3. A nitinol mesh 70 may also be embedded into the anodic fuel receptor 46 to aid in the fuel control mechanism. It is preferable to coat or adequately protect the nitinol strip with a polymer or otherwise isolate the strip from the fuel reactants to avoid a reaction with the chemicals in the cell.

It is preferable that the anode fuel receptor 46 is small enough that the volume of fuel it carries allows for continuous operation of the cell, yet for a quick discontinuance of operation should the fuel flow from the fuel source be stopped, or slowed, by the interruption mechanisms just described.

Figure 5A:
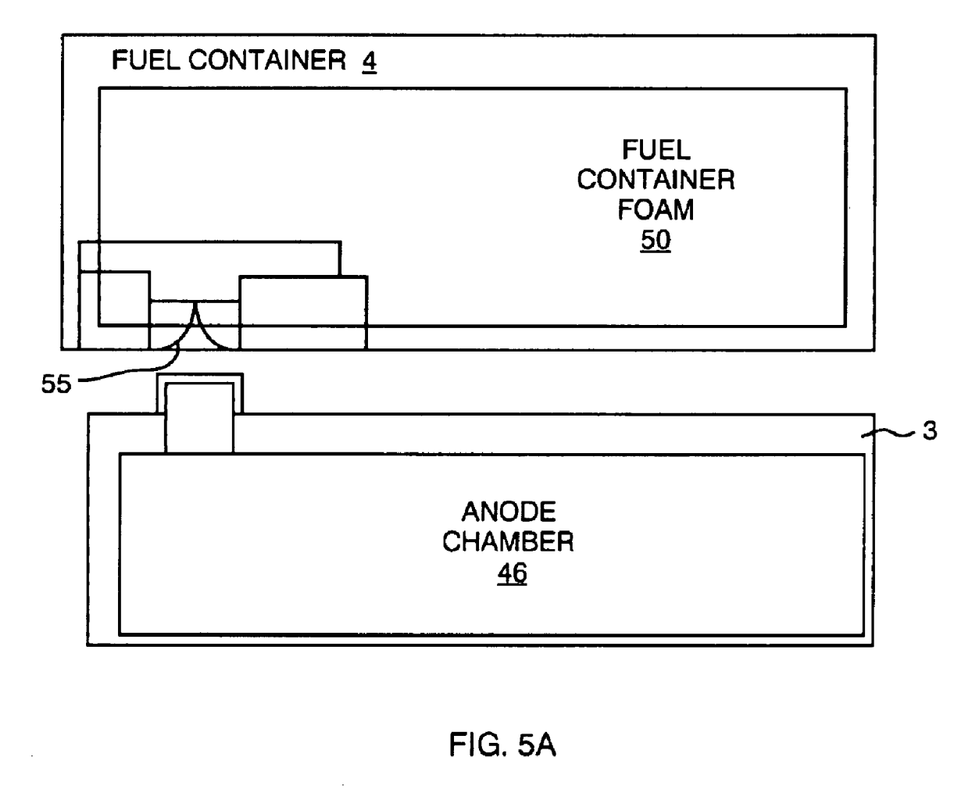
FIG. 5A is a schematic illustration of one embodiment of the fuel delivery cartridge that includes a duck bill mechanism in accordance with the invention.
Figure 5B:
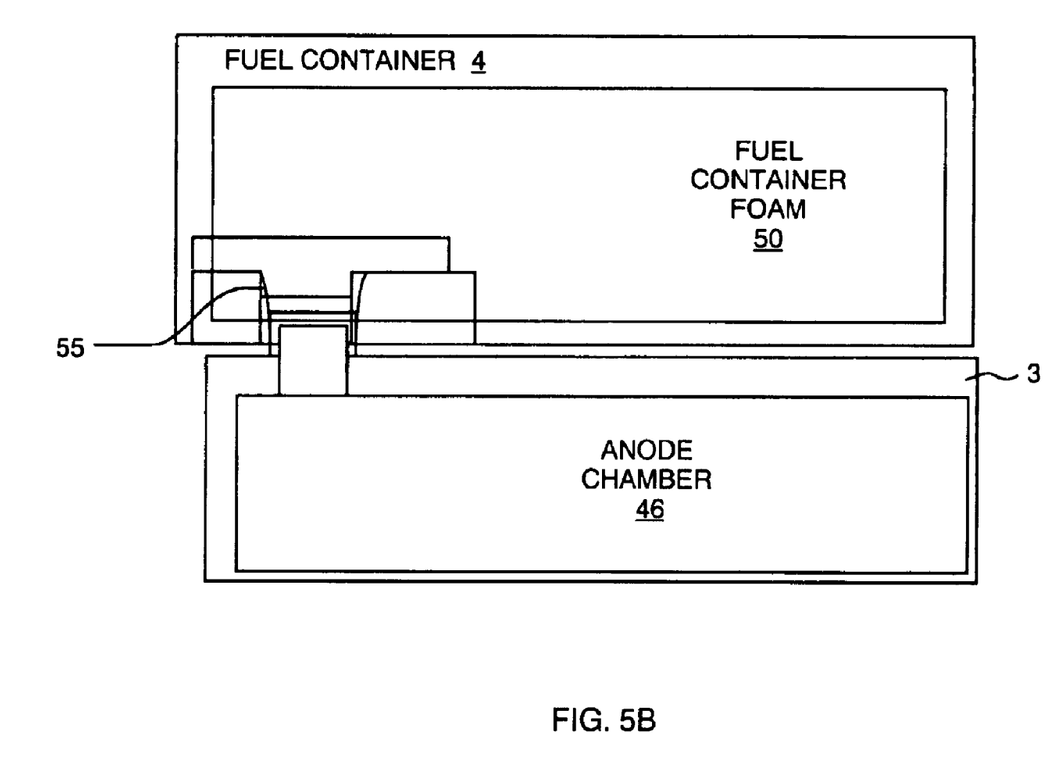
FIG. 5B is a the device of FIG. 5A with the anode chamber inserted into the duck bill mechanism of the fuel delivery cartridge of the present invention.

Referring now to FIGS. 5A and 5B, a safety feature, in which fuel flow is halted when the cartridge is separated from the cell will be described. In FIGS. 5A and 5B, the fuel delivery component 50 as illustrated in the fuel cartridge 4, is larger for purposes of clarity of illustration that it would typically be in most practical applications. It is preferable that the fuel delivery component 50 will be as small as practical to allow a larger amount of liquid fuel solution to be stored in the cartridge 4. In this embodiment, its size is almost the same as cartridge 4. This allows for some free fluid in the cartridge. A duckbill mechanism 55 is located where the anode component will be inserted (FIG. 5B). When the fuel cell is to be activated, the anode component is plugged into the duckbill mechanism 55, and the flow of fuel commences. When it is removed, fuel does not leak out of either the fuel cartridge 4, or the fuel cell 3.

One skilled in the art will recognize that there are a variety of other ways in which to achieve this objective, including, but not limited to including a device for automatically stopping fuel from escaping from the fuel delivery cartridge into the ambient environment, when the cartridge is disconnected or physically separated from the fuel cell, or fuel cell system.

Figure 6:
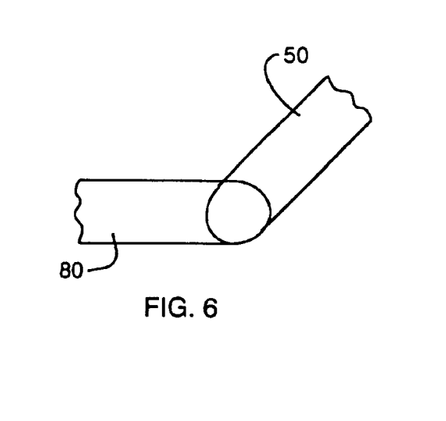
FIG. 6 is a schematic isometric illustration of the fuel delivery component of the present invention covered with Kapton tape prior to use.

As illustrated in FIG. 6, the fuel delivery component 50 is sealed for initial shipment prior to being inserted into the fuel cartridge 4. The fuel delivery component 50 is sealed off by a piece of Kapton tape 80, or other suitable, non-permeable tape is placed over an exposed portion of the fuel delivery component 50 and may be removed from this before it is placed in the fuel cartridge or in contact with anodic fuel receptor 46, in order to begin the flow of fuel into the fuel cell.

Figure 7:
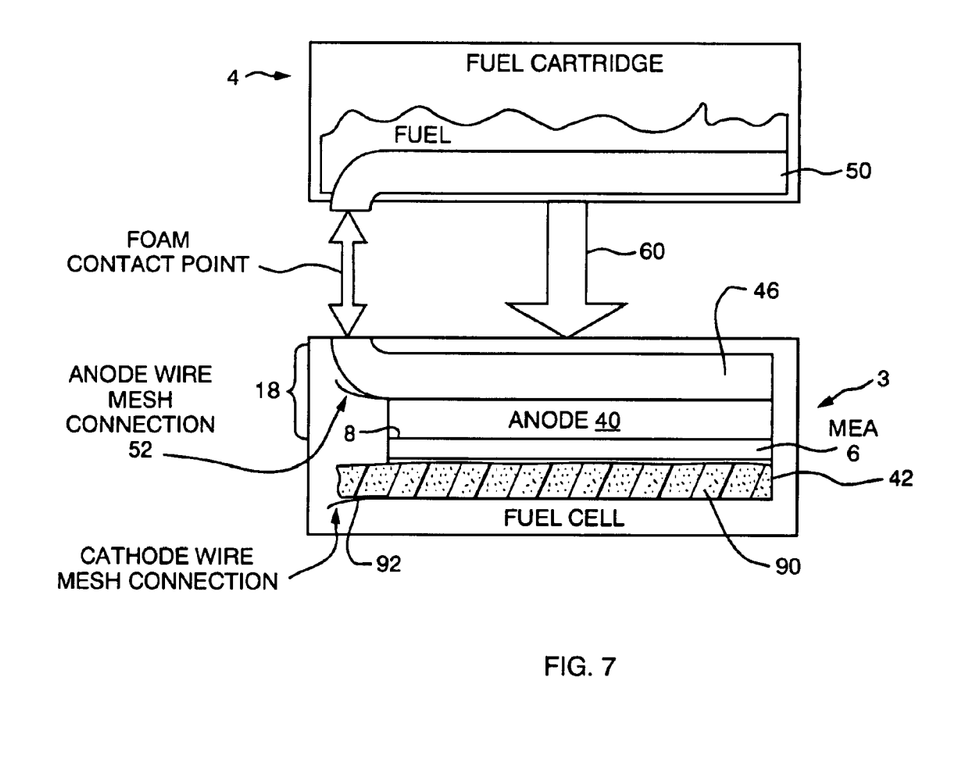
FIG. 7 is the fuel cell and fuel cell cartridge of FIG. 3 also illustrating a component in the cathode chamber.

The cathode side of the fuel cell may also include a wicking or foam-based component or similar material. This is illustrated in FIG. 7, in which the cathode chamber 20 of the fuel cell 3 includes a wicking component 90 which may be employed to draw water away from the cathode face 10 of the MEA 6, while allowing oxygen to come in contact with the membrane. Conductivity may also be increased using the cathode wire mesh 92, as illustrated in FIG. 7.

Figure 8:
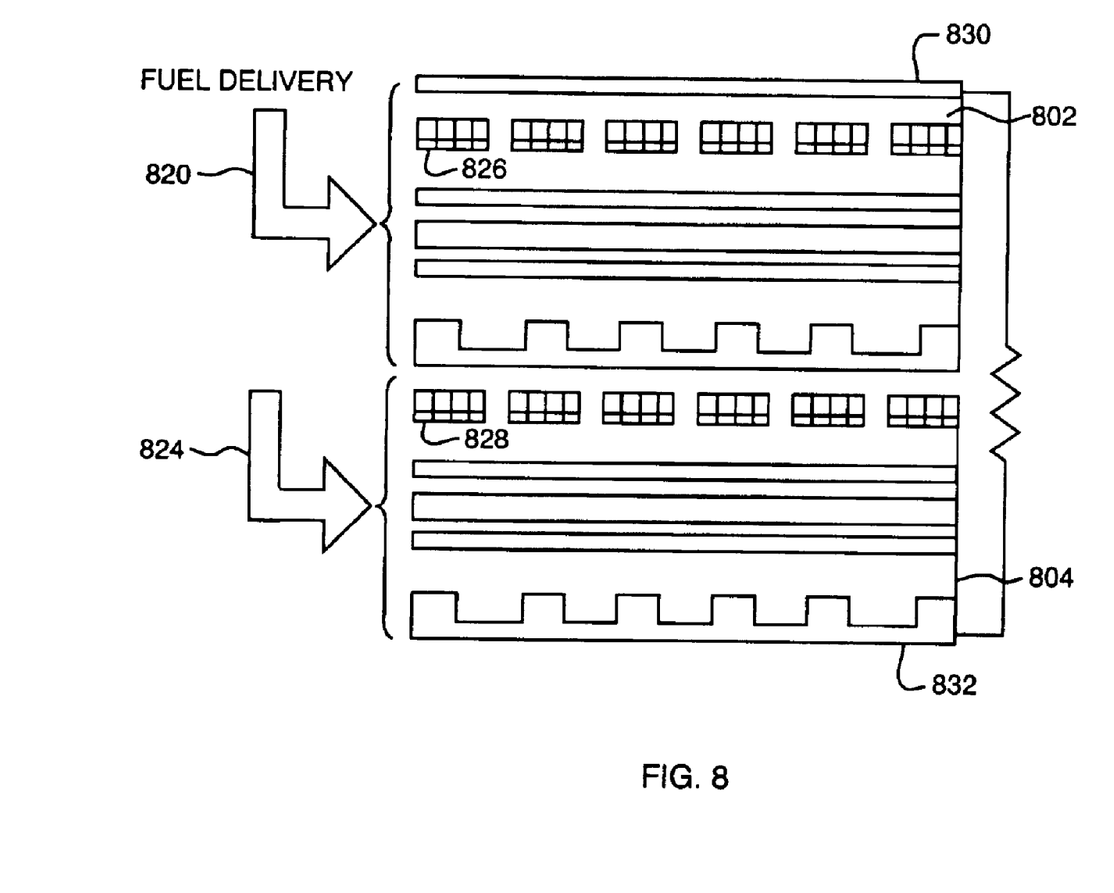
FIG. 8 is an embodiment of the system of the present invention in which a plurality of fuel cells are electrically connected as a bipolar stack.

This invention may be readily adaptable for use with a plurality of fuel cells that are in physical communication with one another including, but not limited to, a bipolar stack configuration of direct oxidation fuel cells which are connected together as a single power supply unit. This is illustrated in FIG. 8 in which a single power supply unit 800 is comprised of a plurality of individual cells 802, 804. As will be understood by those skilled in the art, the stack may comprise more than two cells, and may include many cells, while remaining within the scope of the present invention. As illustrated in FIG. 8, multiple "arms" 820 and 824 are disposed between cells, which communicate with anode receptors 826, 828 in the anode chambers of each cell (respectively) in the stack 800. These arms 820, 824 are coupled to a fuel source and they thus deliver fuel to the anodic receptors of the cells, 826, 828, in the same or a similar manner that the fuel delivery component 50 of FIG. 1 delivers fuel to the anodic receptor 46 of FIG. 1. Each of the arms 820, 824 may be a branch off of a single trunk, or may be a discrete component in communication with the fuel delivery component, or fuel source. The cells in the stack are electrically connected to the load by an electrically conductive connector that couples the load to the anode collector plate 830 of the first cell 802 and the cathode collector plate 832 of the final cell 804 in the stack 800. It is also noted that the anodic receptor components in each cell need not be comprised of a conductive foam as long as there are sufficient electrical connections between each of the bipolar plates and the fuel cells to create the desired voltage within the stack 800.

Figure 9:
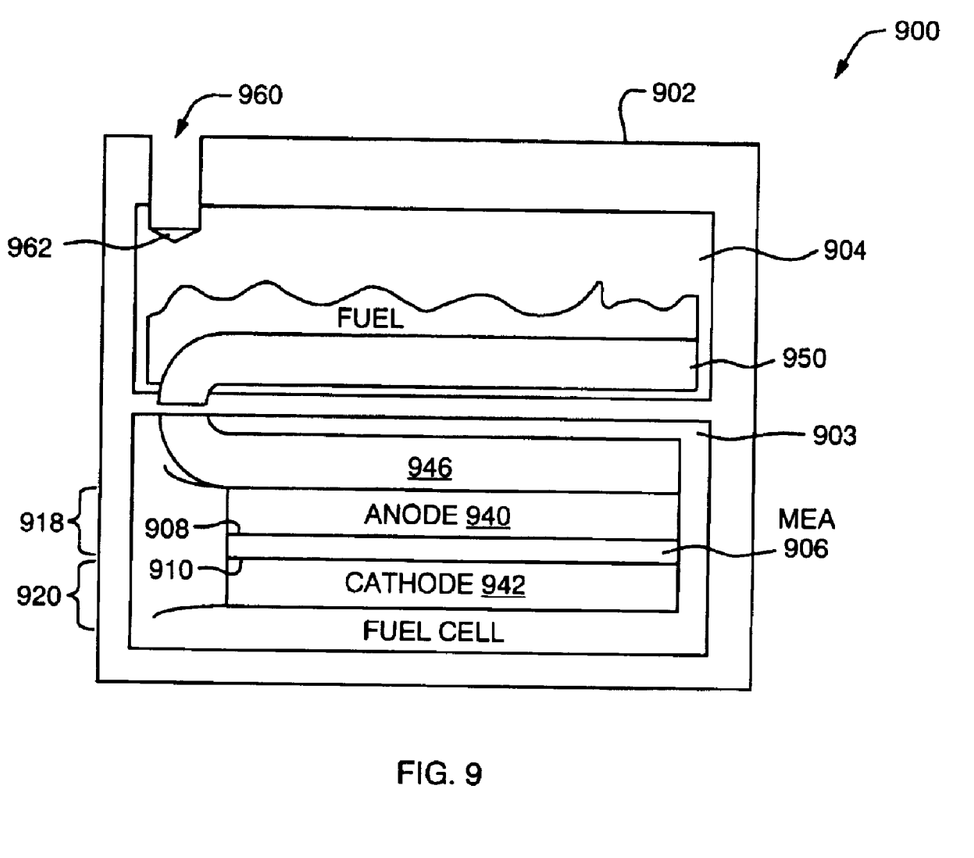
FIG. 9 is the another embodiment of the system of the present invention that is enclosed as a unit and is refillable with fuel from an external source.

Also, in accordance with another embodiment of the invention, a refillable unit may be desirable in certain applications. As illustrated in FIG. 9, a direct oxidation fuel cell system 900 is encapsulated in a housing 902, and it includes a fuel cell 903 and a fuel storage and delivery container 904. The fuel cell contains an MEA 906, the anode chamber 918, and the cathode chamber 920. Disposed within the anode chamber 918 is an anodic fuel receptor component 946, which is comprised of materials set forth herein. This anodic fuel receptor 946 transports fuel towards the MEA 906. Fuel is delivered to the anodic fuel receptor 946, as it is consumed, by a corresponding fuel delivery component 950 disposed in the fuel storage and delivery container 904 which is contained within the housing 902. In order to fill the fuel storage and delivery container 904 with fuel solution, or to re-fill it, methanol, or an aqueous methanol solution) can be introduced into the system 900 via the opening 906 in the housing 902, which in turn communicates with the port 962 in the fuel delivery component 950, in order to "wet" the fuel delivery component 904 either to saturation or on a metered basis. After the fuel is consumed, more fuel can be added to the fuel storage and delivery container, when desired.

It should be understood that the present invention provides a simplified fuel delivery scheme that allows for only that fuel which is consumed to be delivered to the fuel cell. This results in more efficient fuel delivery and less waste of fuel including less fuel crossing over the membrane. In addition, carbon dioxide is vented. Thus, a more efficient simpler fuel cell includes lower parasitic losses and is less expensive for mass manufacturing. Thus, it should be understood that the improved fuel cell and fuel cartridge of the present invention for use with a direct oxidation fuel cell system provides many advantages.

The foregoing description has been directed to specific embodiments of the invention. It will be apparent however that other variations and other modifications may be made to the described embodiments with the attainment of some or all of the advantages of such therefore, it is the object of the appended claims to cover all such variations and modifications as come within the true spirit and scope of the invention.

What is claimed is:

1. A fuel cartridge for use with a direct oxidation fuel cell, comprising;
   (A) an exterior housing containing a fuel solution, said housing having an exit port through which fuel is transported out of the cartridge; and
   (B) a fuel delivery component, comprised substantially of a material, which fuel delivery component, is substantially saturated with fuel for delivery to said fuel cell as fuel is consumed by said fuel cell, said fuel delivery component having a contact point extending through said exit port in said housing.

2. The fuel cartridge as defined in claim 1 wherein said fuel delivery component is substantially comprised of a foam-based material.

3. The fuel cartridge as defined in claim 1 wherein said fuel delivery component is substantially comprised of an expanded polymer.

4. The fuel cartridge as defined in claim 1 wherein said fuel delivery component is substantially comprised of a felted metal material.

5. The fuel cartridge as defined in claim 1 further comprising a second port through which said cartridge may be refilled.

6. The fuel cartridge as defined in claim 1 including means for interrupting the flow of fuel from said fuel delivery component.

7. The fuel cartridge as defined in claim 6 wherein said means for interrupting the flow of fuel is comprised substantially of tape substantially covering said contact point, and wherein said fuel delivery component is comprised substantially of a hydrophilic foam component.

8. A direct oxidation fuel cell having an associated fuel source containing a fuel solution, comprising:
   (A) an outer container;
   (B) a membrane electrode assembly disposed within said outer container, including:
      (i) a protonically conductive, electronically non-conductive membrane electrolyte, having an anode face and an opposing cathode face, an anode chamber being defined between said anode face and an interior wall of said container and a cathode chamber being defined between said cathode face and an interior wall of said container; and
      (ii) a catalyst coating disposed on at least one of said anode face and said cathode face, whereby electricity-generating reactions occur upon introduction of fuel solution from the associated fuel source, including anodic dissociation of said fuel solution into carbon dioxide, protons and electrons, and cathodic combination of protons, electrons and oxygen from an associated source of oxygen, producing water;
   (C) an anodic fuel receptor material disposed in said anode chamber in intimate contact with an anodic diffusion layer, said anodic fuel receptor material allowing fuel solution to be drawn from said associated fuel source in such a manner that said fuel solution is drawn into said anode chamber as fuel is consumed at said anode; and
   (D) means for collecting electric current provided in said electricity-generating reactions to provide said electric current to an external load.

9. The direct oxidation fuel cell as defined in claim 8 wherein said anodic fuel receptor material is comprised substantially of a conductive material to which a process or second material has been applied to create an electronically conductive, porous, high capillarity material.

10. The direct oxidation fuel cell as defined in claim 8 wherein said anodic fuel receptor material is comprised substantially of foam materials.

11. The direct oxidation fuel cell as defined in claim 8 wherein said anodic fuel receptor material is comprised substantially of a felted metal material.

12. The direct oxidation fuel cell as defined in claim 8 further comprising a wire mesh disposed between said anodic diffusion layer and said anodic fuel receptor material to facilitate conducting electrons produced in said anodic reaction to the external load.

13. The direct oxidation fuel cell as defined in claim 8 further comprising a cathodic foam component comprised substantially of a hydrophilic material which draws water away from said cathode face of said membrane.

14. The direct oxidation fuel cell as defined in claim 13 further comprising a wire mesh disposed between said cathodic diffusion layer and said cathodic foam component to facilitate conducting electrons.

15. The direct oxidation fuel cell as defined in claim 8 further comprising a vent disposed in said anode chamber to allow carbon dioxide to flow out of said anode chamber.

16. The direct oxidation fuel cell as defined in claim 15 wherein said vent is comprised substantially of a material that resists oxygen from entering said anode chamber.

17. The direct oxidation fuel cell as defined in claim 16 wherein said vent is comprised substantially of a polytetrafluoroethylene material.

18. A direct oxidation fuel cell system comprising:
   (A) a direct oxidation fuel cell including:
      (i) a membrane electrode assembly, including:
         a.) a protonically conductive, electronically non-conductive membrane electrolyte, having an anode face and an opposing cathode face; and
         b.) a catalyst coating disposed on at least one of said anode face and said cathode face, whereby electricity-generating reactions occur upon introduction of fuel solution from an associated fuel source, including anodic dissociation of said fuel solution into carbon dioxide, protons and electrons, and cathodic combination of protons, electrons and oxygen from an associated source of oxygen, producing water;

(ii) an anodic fuel receptor material disposed in said anode chamber in intimate contact with an anodic diffusion layer, said anodic fuel receptor material allowing said fuel solution to be drawn from said associated fuel source in such a manner that said fuel solution travels through to said anode face as fuel is consumed at said anode;

(iii) means for collecting electric current provided in said electricity-generating reactions to provide said electric current to a load; and (B) a fuel container and delivery assembly adapted to be coupled to an associated fuel source when said fuel container is to be filled with fuel and said fuel container and delivery assembly adapted to be coupled to said direct oxidation fuel cell, when fuel is being delivered to said fuel cell.

19. The direct oxidation fuel cell system as defined in claim 18 wherein said fuel container and delivery assembly comprises;

(A) an exterior housing containing a fuel solution, said housing having an exit port through which fuel is transported out of the cartridge; and (B) a fuel delivery component, comprised substantially of a material which is substantially saturated with fuel for delivery to said fuel cell as fuel is consumed by said fuel cell, said fuel delivery component having a contact point extending through said exit port in said housing.

20. The direct oxidation fuel cell system as defined in claim 19 wherein a contact point is defined at the connection between said fuel delivery component and said anodic receptor material, and flow of fuel from said fuel delivery component to said anodic receptor material is interrupted when said contact point is broken.

21. The direct oxidation fuel cell system as defined in claim 20 further comprising means for interrupting flow of fuel across said contact point.

22. The direct oxidation fuel cell system as defined in claim 21 wherein said means for interrupting the flow of fuel across said contact point is a pair of shape memory alloy strips placed adjacent said contact point, which have a first shape that allows the contact to be made between the fuel delivery component and the anodic receptor material to allow the flow of fuel therebetween, and a second shape that interrupts said contact between said fuel delivery component and the anodic receptor material.

23. The direct oxidation fuel cell system as defined in claim 22 wherein said shape memory alloy strips are comprised substantially of nitinol.

24. The direct oxidation fuel cell system as defined in claim 22 further comprising a means for providing an electric current across said shape memory alloy strips to cause each of said shape memory alloy strips to take a second shape, thus interrupting the flow of fuel in said system.

25. The direct oxidation fuel cell system as defined in claim 18 further comprising said fuel delivery cartridge including a mechanism at said exit port whereby flow of fuel out of said fuel cartridge is halted when said mechanism is in a closed position, and said mechanism automatically changes to said closed position when said fuel delivery cartridge is disconnected from said fuel cell.

26. The direct oxidation fuel cell system as defined in claim 25 wherein said mechanism is a duckbill valve that moved to an open position when said anode chamber of said fuel cell is connected to said fuel delivery cartridge.

27. The direct oxidation fuel cell system as defined in claim 18 further comprising a fuel cell assembly including a fuel cell stack, and at least one of said fuel cells in said stack including a wicking arm that draws fuel into that cell either from a fuel source, or from a cell which is contiguous to it in said stack.

28. The direct oxidation fuel cell system as defined in claim 27 further comprising each cell in said fuel cell stack including a wicking arm that communicates with the anode face of each cell in the stack.

29. The direct oxidation fuel cell system as defined in claim 18 further comprising refilling said fuel delivery cartridge using a methanol cartridge to substantially saturate said fuel delivery component with fuel solution.

30. The direct oxidation fuel cell system as defined in claim 18 further comprising an interface disposed between said fuel delivery cartridge and said fuel cell to provide a seal against at least one of evaporative losses and leakage losses.

31. A refillable direct oxidation fuel cell system, comprising:

(A) an exterior casing having an opening therein through which fuel solution may be introduced;

(B) a direct oxidation fuel cell including:
(i) a membrane electrode assembly, including:
a.) a protonically conductive, electronically non-conductive membrane electrolyte, having an anode face and an opposing cathode face; and
b.) a catalyst coating disposed on at least one of said anode face and said cathode face, whereby electricity-generating reactions occur upon introduction of fuel solution from an associated fuel source, including anodic dissociation of said fuel solution into carbon dioxide, protons and electrons, and cathodic combination of protons, electrons and oxygen from an associated source of oxygen, producing water;

(ii) an anodic fuel receptor material disposed in said anode chamber in intimate contact with an anodic diffusion layer, said anodic fuel receptor material allowing said fuel solution to be transported from said associated fuel source in such a manner that said fuel solution travels through to said anode face as fuel is consumed at said anode;

(iii) means for collecting electric current provided in said electricity-generating reactions to provide said electric current to a load; and (C) a fuel container and delivery assembly coupled to said direct oxidation fuel cell, said fuel container and delivery assembly including a fuel delivery component that allows fuel to be transported to said anode fuel receptor, and said fuel container and delivery assembly including a re-fueling port that communicates with said opening said casing, for refilling the fuel in said fuel container and delivery assembly.

* * * * *